ELECTRONIC MUSICAL INSTRUMENT

Original Filed Dec. 4, 1933 6 Sheets-Sheet 1

Inventor,

Gilbert Smiley

By Williams, Bradbury, McCaleb & Hinkle Attorneys

ELECTRONIC MUSICAL INSTRUMENT

Original Filed Dec. 4, 1933 6 Sheets-Sheet 2

Inventor

Gilbert Smiley

By Williams, Bradbury, McCaleb & Hinkle

Attorney

ELECTRONIC MUSICAL INSTRUMENT

Original Filed Dec. 4, 1933 6 Sheets-Sheet 3

Inventor

Gilbert Smiley

By Williams Bradbury, McCaleb & Hinkle

Attorney

ELECTRONIC MUSICAL INSTRUMENT

Original Filed Dec. 4, 1933 6 Sheets-Sheet 4

Inventor

Gilbert Smiley

By Williams, Bradbury, McCaleb & Hinkle

Attorneys

ELECTRONIC MUSICAL INSTRUMENT

Original Filed Dec. 4, 1933 6 Sheets-Sheet 5

Inventor
Gilbert Smiley
By Williams, Bradbury, McCaleb & Hinkle
Attorneys

ELECTRONIC MUSICAL INSTRUMENT

Original Filed Dec. 4, 1933 6 Sheets-Sheet 6

Inventor

Gilbert Smiley

Williams, Bradbury

By McCaleb & Hinkle

Attorneys

Reissued Aug. 16, 1938

Re. 20,831

UNITED STATES PATENT OFFICE 20,831

ELECTRONIC MUSICAL INSTRUMENT

Gilbert Smiley, Hingham, Mass., assignor, by mesne assignments, to Hammond Instrument Company, Chicago, Ill., a corporation of Delaware Original No. 2,083,246, dated June 8, 1937, Serial No. 700,836, December 4, 1933. Application for reissue March 28, 1938, Serial No. 198,617

23 Claims. (Cl. 84—1)

The present invention relates to the production of musical sound by electrical means and has for an object to provide an oscillatory thermionic vacuum tube circuit which will produce an electric wave form which is extremely rich in harmonics, the circuit preferably including suitable filter means by which those harmonics desired can be retained. Stated otherwise, the circuit of the present invention is one producing oscillations of a wave form having the harmonics necessary to adapt it to imitate or reproduce sound obtained in the playing of any given instrument by inclusion of appropriate filter means acting to suppress or attenuate certain of the harmonics, as well as to create new tone relationships not necessarily found in existing musical instruments, but which may be found desirable.

Another object of the invention is to provide an oscillatory circuit which is both simple in construction and reliable in operation, the frequency of its oscillations being characterized by extreme stability and capable of being determined or computed with ease and accuracy.

Still another object of the invention is to provide an oscillatory circuit which may be readily adjusted to cause it to oscillate at the proper frequency.

A further object of the invention is to provide an oscillatory circuit capable of having the frequency of its oscillations readily altered during operation to predetermined values so that it may be effectively employed in the playing of different musical notes.

A still further object of the invention comprehends the grouping of a plurality of such oscillatory circuits each adjusted to a predetermined frequency, whereby various chords may be struck.

The invention comprehends in its broad aspect the provision of the necessary number of oscillatory circuits above mentioned, filtering devices and switching arrangements and appurtenances for duplicating the effects obtained by the various pipes, reeds or other elements of musical instruments, including the effects obtainable by the use of various combinations of stops and key manuals, as well as for the origination of tonal effects, not necessarily characteristic of existing musical instruments, but nevertheless desirable.

As a further comprehension and in the nature of a refinement to the apparatus by which the above objects are accomplished, the invention includes a controlling oscillator or master control for one or more of the note-producing oscillatory circuits whereby any tendency of a change in the tuning of some or all of the notes will be automatically corrected. The master control also provides a means for shifting the frequencies of a whole series of oscillators without affecting the tuning of the notes with respect to each other.

To these and other ends the invention also includes other arrangements and combinations of elements, all as set forth in the following specification and particularly pointed out in the appended claims.

In the drawings.

Similar reference characters in the several figures indicate similar parts.

In carrying out the invention the fundamental object of which is to provide a new apparatus for the production of musical sounds, there is provided a vacuum tube oscillator which will produce audible frequency oscillations the wave form of which lends itself to musical use. In other words an oscillatory circuit constructed in accordance with the invention will produce a wave which possesses at any of the frequencies to which the circuit may be tuned the harmonics required to give the desired musical color or timbre, so that the circuit may be adapted to match or reproduce the notes of any given instrument, as well as to generate its own variations of tone, by proper inclusion of adjustable filtering elements. The circuit which is provided includes the further advantage that it gives an immediate full response upon the closing of a key without time lag incident to building up of the energy required for its operation and produces a sustained note of the predetermined frequency during the period of key depression. These factors are considered important characteristics of the invention and enable the production of musical sounds with great fidelity. Furthermore, it is possible to duplicate the effects produced by a complicated instrument, such as an organ, by means of apparatus capable of assembly in a comparatively small space.

The oscillatory circuit of the present invention establishes audio-frequency oscillations by the time constant characteristic of a condenser discharging through a resistor. Generally stated, such circuit employs a thermionic vacuum tube in association with a potential feed-back means closely coupling the plate-cathode circuit through a condenser to the grid, the condenser being in electrical connection through the feed-back means with the cathode and therefore in a closed-circuit relation through the cathode with a resistor included in the grid-cathode circuit. The condenser alternately receives a charge and discharges the accumulated charge through the resistor and, because of the close coupling of the plate-cathode circuit to the grid, rapidly accumulates a charge such as to bias the grid beyond cutoff with the result that the period of discharge substantially determines the frequency of the established oscillations, the feed-back means being properly poled for this purpose. Proper choice should obviously also be made of the supply-potential at the grid. It will be apparent from the following description that no precise construction of the interior elements of the vacuum tube is essential and that, although the conventional type of three element thermionic device is illustrated in the various figures, other types of multi-element tubes as distinguished from a triode tube may be used with equally satisfactory results.

Figure 1:
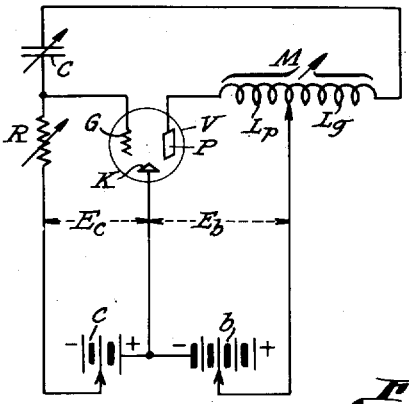
Fig. 1 is a diagrammatic illustration of an oscillatory circuit embodying the invention, illustrated in a simple form to facilitate the description of the fundamental principle of the invention.

The oscillatory circuit illustrated in Fig. 1 comprises a thermionic tube V having a cathode K, a grid G and an anode P. A source of potential, such as a battery *b*, has its negative terminal connected to the cathode K and its adjustable terminal connected through portion L*p* of an inductance M to the plate P, the other portion L*g* of said inductance being connected at its outer end through a condenser C to the grid G. Also connected to the grid G is a resistor R, a second source of potential *c* being connected between this resistor and the cathode K. In practice the potential values E*b* and E*c* may be adjusted by using a voltage divider D (Fig. 2), E*c* being so determined with reference to the capacity of the condenser C that, when the latter is charged to its operating point, the grid is biased beyond the cutoff point of the tube and no substantial current flows in the plate circuit.

The elements R, C, M and the two sources of potential are each variable at will. By their adjustment the fundamental oscillatory frequency of the circuit can be established in the first instance and may subsequently be changed as desired. The chief methods of controlling the frequency generated by the circuit are by adjustment of the values of resistance R and condenser C and by adjustment of the supply-potential E*c*. By using fixed values of R and C of approximately the proper relative values, final tuning may be accomplished by the variation of E*c*. After this adjustment of the potential E*c*, the potentials E*b* and E*c* should bear a fixed relation to each other. In order that they may maintain such relation, the potentials E*b* and E*c* should be derived from the source, as in Fig. 2.

In explaining the oscillatory action of the circuit and the production of audible frequencies determined by the above mentioned elements, it will be assumed that at a given instant such charge has been accumulated in the condenser C that the grid G of the tube V is sufficiently negative to prevent passage of plate current. Obviously the condenser will not retain this charge as there is a path through the resistor R, the instrumentalities producing the potentials E*c* and E*b* and the winding L*g*, around which it can discharge at a rate determined by the resistance of this circuit.

The condenser C discharges according to the mathematical relationship that $$V_s = V_{s0}\, e^{-\frac{t}{R'C'}}$$

where $V_s$ = the terminal voltage of the condenser at any instant,
$V_{s0}$ = the terminal voltage of the condenser at time zero,
$e$ = the natural logarithmic base,
$t$ = the time in seconds from time zero, and,
R′ and C′ are the resistance and capacity respectively of the condenser-discharge circuit.

Designating the period of discharge of the condenser C during the operation of the circuit by the symbol T, the ratio $V_s/V_{s0}$ at the end of such period is $$e^{-\frac{T}{R'C'}}$$

and, for given values of R′ and C′ and regardless of the initial voltage value $V_{g0}$, is a factor of the period T and of the period T alone.

Figure 12:
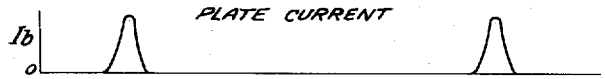
Figure 13:
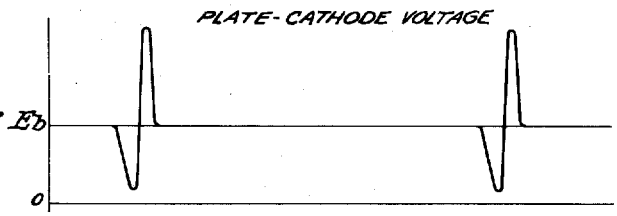
Figure 14:
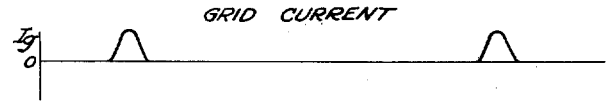

As time progresses, therefore, the condenser C will continue to discharge through the resistor R and the effect of this discharge will be to render the grid-cathode voltage (Fig. 11) progressively less negative until, depending upon the parameters of the tube V, the time T will be reached when the grid-cathode voltage is such that plate current (Fig. 12) can begin to pass, provided that the grid supply-potential Ec is insufficiently negative of itself to produce cutoff conditions. As soon as plate current starts, and depending upon its rate of change, a reactive voltage is set up in the winding Lp of inductance M, the latter winding opposing the change in the status quo. Through the medium of mutual inductance M, however, induced voltage is transferred to the winding Lg, which causes the grid-cathode voltage to increase in a positive direction, which, in turn, through the action of the triode, tends still further to increase the plate current. Thus a self-accelerating or regenerative action is created, wherein increasing positiveness of the grid sets up increasing plate current, which still further increases the grid potential in a positive direction. As the plate current increases, however, the effective plate-cathode voltage (Fig. 13) decreases owing to the opposing action of the reactive voltage set up by the rise of plate current through the winding Lp. Similarly, the increasing positiveness of the grid causes the grid-cathode voltage eventually to pass through zero from the negative to the positive region, and the grid-cathode circuit becomes conducting, at which point the grid starts to permit current to pass from the grid to the cathode (Fig. 14), which current causes a charge to accumulate in the condenser C. Shortly a limitation is reached corresponding to which the condenser C no longer accumulates a charge and the grid, for this and other reasons, ceases to become further positive. At this moment plate current has risen to a maximum and then a reverse regenerative action takes place. As soon as the rate of change of plate current ceases to increase, both the induced voltage in the winding Lg and the grid potential depending upon it start to decrease. This decrease or return toward negativeness of the grid potential causes the plate current to decrease and the grid-plate regenerative action again takes place, though now in the opposite direction. As soon as the grid-cathode voltage passes out of the conducting region, the charge accumulated in the condenser C by the passage of grid current is locked in, as it were, and can only escape by the way of the path offered by the resistance R. The plate current rapidly falls to substantially zero and the grid is now negative beyond the cutoff point because of the charge present in the condenser C. This charge includes the normal charge present from the combined potentials Eb and Ec, and is caused by a transfer of energy from the plate circuit to the grid circuit of the tube, a portion of which energy goes to make up the condenser charge, which may be represented by the symbol Q. From the time the grid-cathode voltage passes out of the conducting region to the time that the plate current ceases, such a small interval elapses that the discharge of condenser C through resistor R during this interval is, for all practical purposes, negligible. However, such discharge does take place, and so cannot be overlooked. Thus, when the plate current cycle of operation is completed, the grid-cathode voltage is $Q/C$ minus a small amount, where Q represents the maximum charge (over and above that charge induced by the potentials Eb and Ec), which was acquired during the action just described. From this point on resistor R and condenser C take charge of the operation of the circuit.

Figure 11:
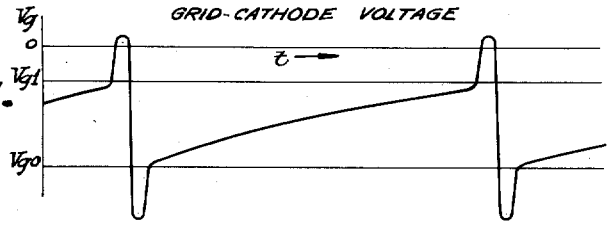
Figs. 11 to 14 are curves showing corresponding changes occurring with time in the grid-cathode voltage, plate current, plate-cathode voltage and grid current of the tube of the oscillatory circuit of the invention, respectively.

Referring to Fig. 11, the condenser C discharges from the voltage $V_{g0}$, equal in value to $Q/C$, to the voltage $V_{g1}$ causing cutoff potential at the grid G, at which instant the cycle of operations is repeated. Depending upon the constants of the circuit to some extent, the charge Q and the voltage $V_{g0}$ depending upon it are determined by the magnitude of the plate supply-potential Eb. Likewise the cutoff voltage $V_{g1}$ is determined by Eb through the medium of the amplification constant of the tube. Supposing Ec to be zero, it is obvious that, other things remaining constant, if Eb be increased or decreased by some factor, $V_{g0}$ and $V_{g1}$ will be similarly changed by the same factor. And, since the ratio $$V_{g1}/V_{g0}=e-\frac{T}{R'C'}$$

changing both terms of that ratio by the same factor will leave the exponential term unchanged. Thus, for given values of R′ and C′ time indicated by T must remain fixed so that, since the cycle of plate current passage is over in a minute fraction of the time required for the entire cycle, the frequency of the established oscillations is determined by the period of condenser discharge almost to the exclusion of all other factors.

Figure 16:
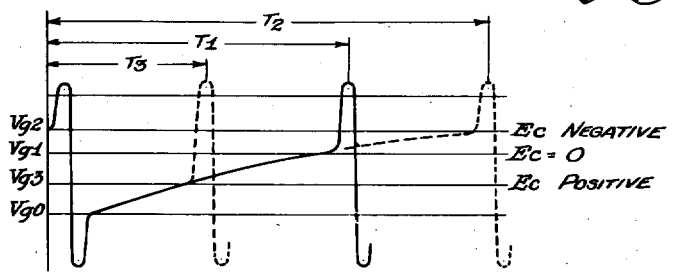
Fig. 16 shows three grid-cathode voltage waves of different frequency, illustrating frequency control by grid supply-potential variation.

Under the circumstances when Ec is not zero, it will be found that Ec must be changed in proportion to Eb if the same frequency of established oscillations is to be maintained. Variation in Ec acts to change the point of time on the discharge curve at which cutoff potential is reached. The cutoff potential for zero grid supply-potential, or the condenser discharge voltage $V_{g1}$, may be represented by the ratio $Eb/u$, where $u$ is a constant of the tube. If now the grid supply-potential is made negative (by connecting the negative terminal of the instrumentality $c$ to the resistor R), the condenser C must discharge to a voltage $V_{g2}$ equal to $Eb/u$ minus Ec, rather than simply $Eb/u$ as is the case when $Ec=0$, the voltage $V_{g2}$ being therefore smaller than the voltage $V_{g1}$. Referring to Fig. 16, the condenser discharge period T when $Ec=0$ is indicated by T1. Since $V_{g2}$ is smaller than $V_{g1}$, substituting $V_{g2}$ in the exponential equation must of necessity increase the period T to a definite value T2, all other factors being constant. Similarly, if Ec is made positive, the period T will decrease to a definite value smaller than T1, as the ultimate condenser discharge voltage $V_{g3}$ will be large than $V_{g1}$.

Figure 15:
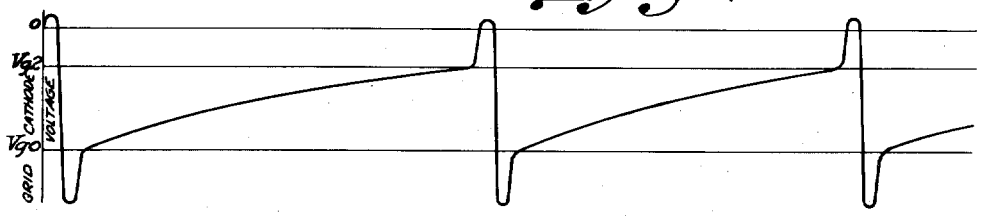
Fig. 15 shows two consecutive cycles of the output wave as derived from the grid-cathode branch of the oscillatory circuit, from the instant the operation of the device is initiated.

It will be apparent from the foregoing discussion that to keep the frequency of the established oscillations constant, it is necessary to change Ec in proportion to Eb, but that, regardless of the value of Ec, such frequency is substantially exclusively determined by the period of condenser discharge. The periods of time between condenser discharges are indeed extremely short and are purposely exaggerated in Figs. 11 to 16 for clarity of illustration, it being also apparent that the wave form of the oscillations established in either grid-cathode or plate-cathode circuit (see Figs. 15 and 15a) is extremely rich in harmonics.

So far the discussion has concerned itself with changes in operating potentials and the actual cycle of operation. Suppose either of the factors R′ and C′ or both of these factors be changed in the exponential equation by correspondingly altering the values of the resistance R and capacity C, it is seen from this equation that T increases with increases in either C′ or R′ and that the increase in T is proportional to the increase in C′ or R′. This must be so if the exponent is to be kept constant to keep the ratio of full charge voltage to cutoff voltage constant, which is, of course, fixed by other considerations, within wide variations of resistance R and capacity C. It should also be observed that the presence of leakage inductance in the windings Lg and Lp or of resistance in these windings or in series with the supply-potentials or with the grid itself, will all affect the initial charge Q, by limiting it to a greater or less extent, and to a corresponding extent also affect the frequency of the established oscillations.

Figure 2:
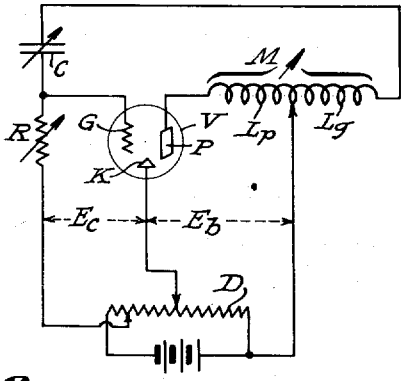
Fig. 2 is a similar view showing another way in which the plate and grid potentials may be applied to the tube circuit.
Figure 3:
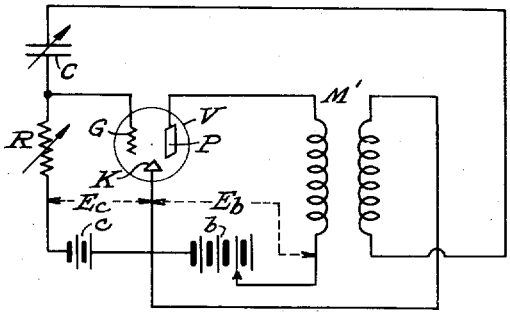
Fig. 3 is a modification showing the use of separate transformer windings in lieu of the tapped mutual inductance of Figs. 1 and 2.

The operation of the circuits of Figs. 1 and 2 may be considered as typical of other arrangements which may be utilized to produce audible-frequency oscillations of a wave form suitable for musical instrument purposes, wherein the coupling between the plate-cathode circuit and the grid is sufficiently close to permit the accumulation of a sufficient charge in a grid condenser to produce grid potentials in excess of cutoff potential and wherein the condenser in discharging through a resistance determines the time period or frequency of the established oscillations. The oscillatory circuit, for example, may take the form shown in Fig. 3, where a transformer M′ having its windings closely coupled to one another is substituted for the auto-transformer M of Fig. 1. The action of the circuit of Fig. 3 is practically identical to that of Figs. 1 and 2, but here the supply-potential Eb is separated from the condenser-discharge circuit. Similarly, any existing means of securing feed-back may be employed if suitable provision is made to assure that the charge accumulated by the grid condenser is sufficient to carry the grid potential beyond the cutoff point of the particular vacuum tube employed, so that the discharge characteristic of the condenser is the major factor in frequency determination.

The type of oscillator described is especially adapted for the purpose intended, as it maintains a substantially constant ratio of the limit voltages between which condenser discharge takes place, regardless of wide fluctuations in its supply potentials Eb and Ec, provided the instrumentalities producing these potentials are so arranged that, if any variation occurs in one, a corresponding or proportional variation will simultaneously occur in the other. This can be easily accomplished by proper derivation of the two potentials from the same source.

Figure 4:
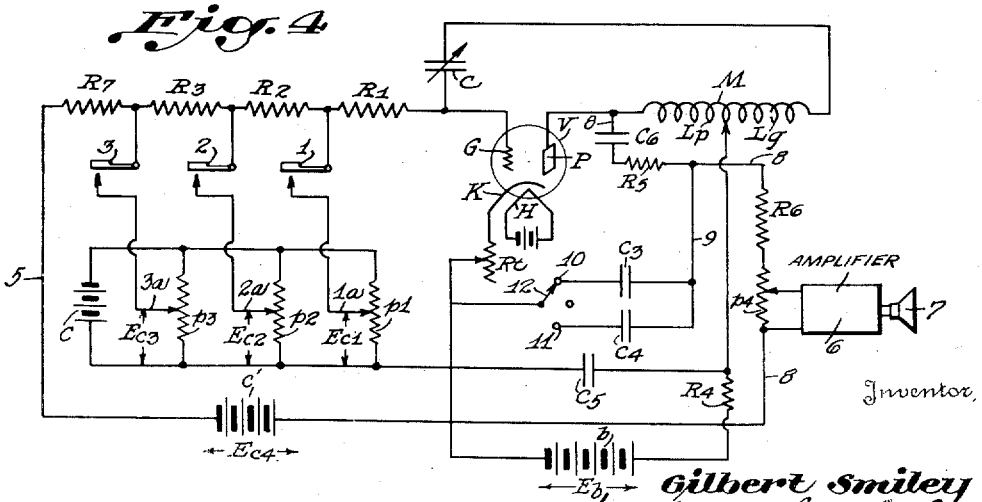
Fig. 4 is a diagrammatic layout of a single tone instrument embodying the invention.

In further elaboration of this invention and in order to illustrate its embodiment in an instrument suitable for the creation of formal music, there are shown in Fig. 4 certain circuit arrangements by means of which single notes may be successively produced in the playing of melodies. The parts heretofore described bear the same reference characters in Fig. 4 and it is, therefore, only necessary to mention the additional elements introduced to provide the control features which permit such rendition of music. In Fig. 4 it will be observed that there have been substituted for the single resistance R of Figs. 1 to 3 a plurality of resistances which, in practice, correspond in number to the number of notes desired, three being provided in the embodiment illustrated, namely R1, R2 and R3. These resistances are all connected in series with one another and with the grid G of the tube V and are respectively associated with the switches 1, 2, and 3, which may constitute the keys of the musical instrument. Potentiometers p1, p2, and p3, also corresponding in number to the number of notes desired, are bridged across the common source c of biasing potential, the switches 1, 2, and 3 being respectively connected between the outer terminals of the resistances R1, R2, and R3 and the sliders 1a, 2a and 3a of the potentiometers p1, p2 and p3. Tuning for each of the separate notes within the range of the instrument may be effected by merely adjusting the sliders 1a, 2a, 3a, which determine the individual grid-supply potentials Ec1, Ec2 and Ec3. Obviously, the frequency of the note produced by depressing key 1 is determined by the discharge of the condenser C through the resistance R1, the frequency of the note produced by depressing key 2 is determined by the discharge of the condenser C through the resistances R1 and R2, and the frequency of the note produced by depressing key 3 is determined by the discharge of the condenser C through the resistances R1, R2 and R3.

In the apparatus shown in Fig. 4 there is included in the circuit of cathode K an adjustable tuning resistor Rt by means of which the charge accumulated in the condenser C may be varied to alter the pitch of the instrument as a whole. That is, the resistance Rt is used to tune all notes simultaneously and therefore provides a convenient means of tuning the instrument with others or changing its tuning to conform with recognized pitch, such as international, orchestra or concert. In addition to the foregoing there is included in series with the several key resistances another resistance R7 having its outer terminal connected to the cathode K by a conductor 5 containing a source c′ of predetermined voltage Ec4. Owing to the difficulty of constructing circuits in which leakage resistances are infinite, it may be considered commercially impractical to prevent the condenser C from discharging even with all keys open and R7 omitted. The result of this discharge is to produce a long term cycle upon key release and corresponding noise like spaced "pops", if some means of preventing this is not employed. Thus the potential of c′ is chosen, together with the value of resistor R7, to apply a cutoff or slightly greater potential to the grid when all keys are released, R7 being made sufficiently large to prevent the potential Ec4 from having an appreciable effect on the tuning when any one of the keys is depressed.

Inserted in and across the plate-cathode circuit are a resistance R4 and a by-pass condenser C5, respectively. The condenser C5 acts as a reservoir condenser to by-pass the impedance of the instrumentality b and to insure a relatively steady plate supply-potential Eb during the passage of plate current within the tube. The resistance R4 serves to set the effective value of the supply-potential at the plate P and to isolate the oscillatory plate-cathode circuit of the tube from the instrumentality b, thereby preventing the creation of opposing voltages that might otherwise introduce undesirable coupling effects.

It is understood that the output wave of the oscillator is amplified by a thermionic amplifier 6 of suitable construction and thereafter reproduced in the desired volume by means of a suitable loud speaker 7. This wave is preferably fed to the amplifier through an adjustable filter to permit the tone of the instrument to be controlled by cutting out those harmonics or component frequencies which it may be desired to suppress. Indicative of such a filter there is shown in the output circuit, comprising the wire 8, a resistance R5 with which two condensers C3 and C4 of different capacities are associated. These condensers are connected at one side to a conductor 9 leading to the resistance R5 and at the other side to terminals 10 and 11, with which cooperates a switch arm 12 connected (through the resistance R*t*) to the cathode K. Between the resistance R5 and the plate P a blocking condenser C6 is introduced to prevent the plate supply-potential E*b* from acting through the output net work, which condenser C6 is of sufficient capacity to permit the free passage of the alternating potentials developed. The resistance R5 functions as a filter resistor and isolating resistor and is of such a value that, even if a short circuit occurred at one of the contacts of the filter switch 12, no appreciable change in the frequency of the established oscillations would occur.

Also arranged in the wire 8 is a second resistance R6 and a potentiometer P4, the latter being connected to the amplifier 6. The resistance R6 limits the maximum volume of sound obtainable, while the potentiometer P4 acts as a volume control, its slider being adjustable from zero to the maximum voltage obtainable.

In practice the plate supply-potential E*b* and the potential Ec4, as well as the potential for the cathode-heating element H (where a heater type of tube is used) are derived from the power supply already available in the audio-frequency amplifier 6 used with the oscillator. The amplifier may be of conventional design, with the addition, if desired, of other filtering means for the further control of tone quality. By using the power supply circuits of a commercial amplifier, as a source of supply potentials, the amplifier, in turn, being operated from the power means, and by supplying the potential required across the potentiometers P1, P2 and P3 either from the power mains with a separate power supply device or from the power supply circuits of the amplifier, the various supply-potentials will in a properly designed oscillatory circuit be proportional to each other, or nearly so, at all times. That is, the operation of the device will be substantially stable with relation to supply fluctuations.

The principles thus far disclosed in their relation to a single tone instrument are equally applicable to an instrument capable of producing harmonies. Fundamentally there would be provided for such a purpose a plurality of oscillators such as that of Fig. 1, each tuned by means of the proper choice of the resistance R, capacity C and biasing potential E*c* to a predetermined fundamental frequency. Appropriate switching means, such as keys, would be provided, each oscillator being so arranged that, when its key is depressed, a proper proportion of its output is caused to be conveyed to the input of an amplifier feeding into a loud speaker. Such an apparatus when properly assembled and tuned can be made to play chords and in its essence is the basis of what may be termed an electric organ. By the addition of filter devices coordinated with stop-type controls, any desired change of timbre or tone shading can be accomplished, so that the apparatus will duplicate various instruments, or may be used for the purpose of originating its own discrete tonal values, as distinguished from existing musical instruments. Likewise, all notes can be made subject to either manual or automatic vibrato, and to volume changes accomplished by either knee or manually operated controls, such as are now used in organs for producing such effects.

While it is possible to evolve circuits by which one oscillator can be controlled from a variety of keys, so chosen that no two keys controlling the same oscillator would need to be simultaneously depressed in the rendering of formal music, it is considered best to assign an oscillator for each desired note in order that any desired combination of keys can be simultaneously depressed to produce the related chord sounding in each case.

Figure 5:
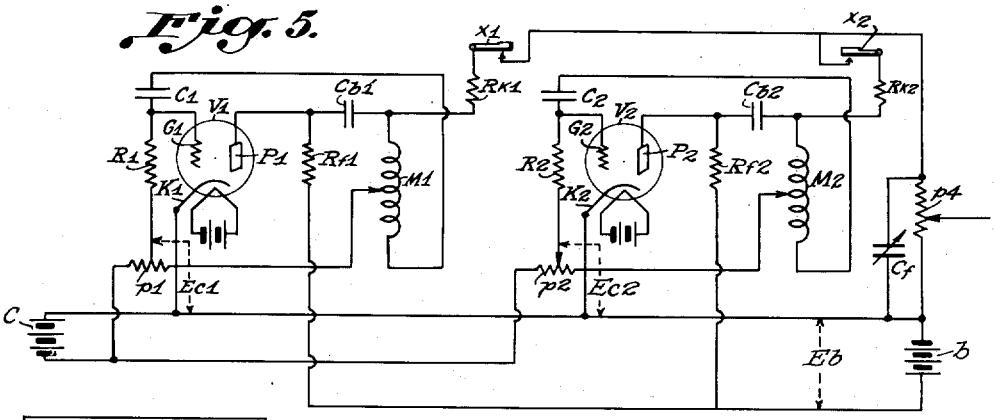
Fig. 5 is a diagrammatic layout of a multi-tone instrument embodying the invention.

Fig. 5 illustrates a circuit arrangement which may be used in constructing such an apparatus, two oscillators being shown for the purpose of simplicity. The two oscillators are identical, except for the choice of the values which should be used for the resistances R1 and R2, condensers C1 and C2 and grid supply-potentials, E*c*1 and E*c*2 in order that the two notes desired may be produced. In this arrangement a parallel feed may be used to connect the plates of the several tubes to the source *b*, resistors R*f*1 and R*f*2 of high value being employed through which the potential E*b* supplied by said source is directly communicated to the plates P1 and P2 of the two tubes V1 and V2 illustrated. The potentiometers *p*1 and *p*2, of course, serve for final tuning after the latter has been approximated by choice of the resistances R1 and R2 and condensers C1 and C2. The condensers C*b*1 and C*b*2, respectively connected in the output circuits of the tubes V1 and V2, isolate the steady potential E*b* from these circuits and prevent its transfer across the plate-circuit windings of the inductances M1 and M2, but are so designed as to freely pass the alternating potentials developed. Besides the condensers C*b*1 and C*b*2 the output circuits of the tubes *b*1 and *b*2 respectively comprise the resistances R*k*1 and R*k*2 and the keys *x*1 and *x*2 associated therewith, the potentiometer or volume control *p*4 being common to both circuits with both keys depressed. The resistances R*k*1 and R*k*2 are so chosen that the voltage appearing across the impedance of *p*4 when one of the note-producing oscillators is being sounded through its associated key, say the circuit of tube V1, will not be coupled back to any appreciable extent through this impedance into the other note-producing oscillator, the oscillator comprising the tube V2 under the assumed condition. Likewise the impedances of the instrumentalities supplying the operating potentials at the plates and grids of the tubes should be kept low in order to prevent undesirable coupling effects.

As is shown in Fig. 5, a capacity C*f* is connected across the potentiometer *p*4 as indicative of a simple means which may be employed. By making this capacity variable between the desired limits various amounts of the higher harmonics may be retained or suppressed at will.

The arrangement of Fig. 5 enables excellent stability of tuning to be obtained. However, there are variable factors such as the effects of humidity on leakage paths, the change in tube parameters with age, etc., which, over a period of time, may tend to throw the apparatus out of tune. If this occurs the potentiometers *p1* and *p2* permit the instrument to be easily retuned during the useful life of the tubes, which is considerable in the apparatus of this invention owing to the relatively low emission demands upon them. Changes in tuning must inevitably occur, however, though usually they are of small magnitude, and for this reason it is deemed highly desirable to provide a means for automatically maintaining the tuning of each note relative to all the others.

Preliminary to explaining how this automatic control is effected, it is to be understood that the invention contemplates the use of a master oscillator. This may be one of the note-producing oscillatory circuits, or a separate oscillatory circuit, preferably one oscillating at a frequency corresponding to one of the higher frequencies of the keyboard. The master oscillator is tied in to the other oscillators in such a manner that any decadence in the operation of any one of the controlled oscillators normally causing it to lack in harmony is checked by controlling impulses from the output of the master oscillator or from the output of a controlled oscillator, whereby all controlled oscillators are caused to oscillate with proper regularity in step with the master oscillator.

The practical or tempered (chromatic) musical scale as employed in a key-controlled instrument is divided into twelve intervals to the octave. Each octave interval is a two to one frequency ratio and the twelve intervals between the successive notes of an octave are all equal to one another, each being given by the ratio of the twelfth root of two. Except for the octave interval, there is thus no harmonic relation between any two notes of a key-controlled instrument. In other words, the tempered scale does not permit the playing of those frequencies which nature demands in the rendition of music, it having been adopted for practical reasons due to the extremely large number of keys which would have to be provided as a result of the frequent changes in the keynotes with reference to which music is written. While the notes of the tempered scale are not naturally related to one another, they are nevertheless very close to being so, as shown by the following tabulation:

*Intervals or frequency ratios in terms of C below*

| | True or natural scale (Key of C) | | Practical or tempered scale | |
|---|---|---|---|---|
| | Fractional values | Decimal values | Exponential values | Decimal values |
| C | 1 | 1.0 | $2^{0/12}$ | 1.0 |
| D | 9/8 | 1.125 | $2^{2/12}$ | 1.12246 |
| E | 5/4 | 1.25 | $2^{4/12}$ | 1.25992 |
| F | 4/3 | 1.33333 | $2^{5/12}$ | 1.33484 |
| G | 3/2 | 1.5 | $2^{7/12}$ | 1.49831 |
| A | 5/3 | 1.66666 | $2^{9/12}$ | 1.68179 |
| B | 15/8 | 1.875 | $2^{11/12}$ | 1.88775 |
| C | 2 | 2.0 | $2^{12/12}$ | 2.0 |

It will be observed that the correspondence between the mathematically derived intervals and the actual musical intervals is relatively close, variations being limited to a few per cent, so slight as to make it difficult to detect by the trained musical ear. The notes of the tempered scale can therefore be stated to be naturally related for all practical purposes. If, now, the remaining semitone intervals be added to the intervals already tabulated, it will be possible, because of the almost true natural relationships of all notes of the tempered scale, to express any given note of said scale in a whole number fraction of any other.

As an example, let us consider the relationship between the note G and the note C next above it on the tempered scale. This relationship very nearly meets the condition that, for every four complete cycles of the C note, there will be very nearly three complete cycles of the lower note G. Thus at each fourth cycle of the note C and each third cycle of the note G, the two notes may be considered to be in phase, provided they are initially sounded together.

Figure 17:
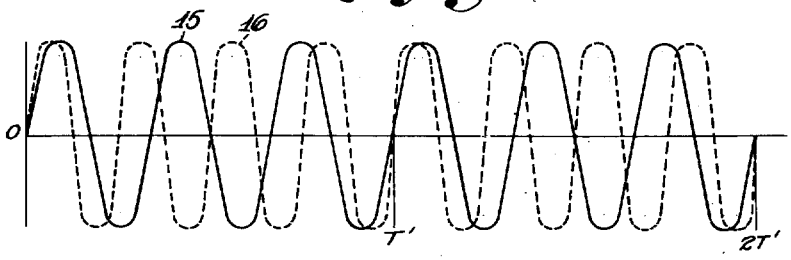
Fig. 17 illustrates two sinusoidal wave forms of different, but harmonically related frequencies.
Figure 18:
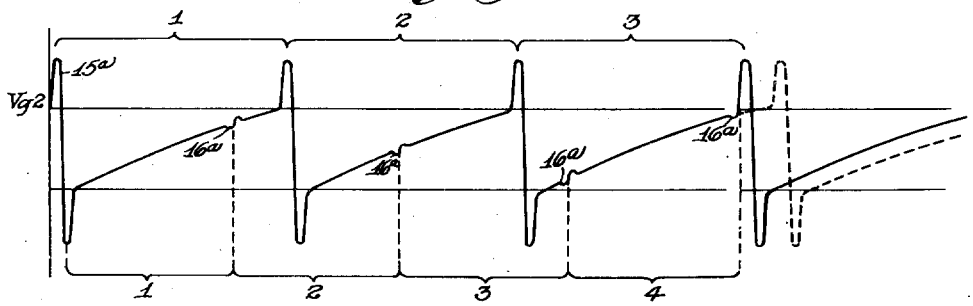
Fig. 18 illustrates the grid-cathode voltage wave of the tube of the oscillatory circuit of the invention and the trigger action of a similar wave superposed thereon by a master or control oscillator.

In Fig. 17 are shown two sinusoidal waves 15 and 16 having the above-mentioned frequency relationship of four to three, and it will be noted that at the third cycle of the lower frequency wave 15 and the fourth cycle of the higher frequency wave 16, the two waves pass through the same value (zero) in the same direction (from plus to minus). Now Fig. 18 shows graphically the grid-cathode voltage wave 15*a* of an oscillator constructed and controlled in accordance with the invention. This oscillator is assumed to operate at the frequency corresponding to the lower pitch note G of the tempered scale, while the controlling oscillator, from which oscillations are supplied to the controlled oscillator in a manner to be hereinafter described, is assumed to operate at the frequency corresponding to the higher pitch note C of the tempered scale. The oscillations produced by the controlling oscillator are similar in wave form to the oscillations produced by the controlled oscillator and under the assumed condition are very nearly related to the oscillations produced by the controlled oscillator by the ratio four to three, the effect of the controlling oscillator on the grid-cathode wave of the controlled oscillator being to produce certain irregularities 16*a* in its condenser-discharge portions, corresponding to which the grid approaches cutoff potential in a positive direction. These irregularities 16*a* are only slight because the controlling wave is suitably attenuated prior to superposition. It will be observed that, during condenser discharge in the oscillator of the present invention, there is a considerable period when the grid-cathode voltage is very close to the cutoff level, but has not quite reached that level, because of which impulses of comparatively small magnitude need be supplied to the grid during such period to cause a change in the point of time at which plate current will again be initiated. Therefore, should the controlled oscillator tend to oscillate at any other than the desired frequency, such an impulse supplied at the proper instant to correct its grid potential to the cutoff value will cause it to be triggered off into its true cycle of operation.

Assuming, for example, that the controlled oscillator producing the wave 15*a* illustrated in Fig. 18 has a tendency to run a slightly lengthened period, then on each successive cycle this effect would normally become cumulative and overshooting would occur as indicated by the dotted lines at the right in Fig. 18. However, on the third cycle the impulse from the controlling oscillator corrects such overshooting and starts the controlled oscillator off in phase again. Obviously, the impulse from the controlling oscillator must be small enough so that it will not trigger the controlled oscillator at any other than the desired point of time. The line $V_{g2}$ in Fig. 18 represents the cutoff potential of the controlled tube, and, while three consecutive impulses are superposed during the first second and third cycles of the controlled wave, it is not until the fourth impulse that the trigger action takes place, since this fourth impulse occurs at an instant when the grid potential of the controlled tube is sufficiently close to the cutoff level to permit the trigger action to take place. From these considerations it is obvious that, for maximum control, the controlling impulse must be as large as possible in order to trigger over the widest possible discrepancy, but not large enough to give rise to a triggering action before the proper cycle.

From the foregoing discussion it is apparent that control may be effected between any two oscillators the frequencies of which are musically related to one another. Consequently, with all oscillators tuned to produce the various notes of the conventional keyboard, they can all, in effect, be tied together, either directly or through the medium of intervening circuits, until all are made subject to the control of a master oscillator. The latter may be any note-producing oscillator, such as the one producing the note middle C. It is possible to use one representing the highest pitch note on the keyboard, or a separate oscillator of still higher frequency may be employed, which is not used for sounding notes. In practice particular care is taken to render the master oscillator exceptionally stable. Some care should also be taken to insure that no controlled oscillator becomes the controller, which may be avoided, by proper coupling between oscillators and proper selection of circuit constants. The controlling effect is sufficiently marked to offset the normal detuning incident to tube aging within operating life limits and to small changes occurring in the values of the resistances and capacities used. Also, if the frequency to which the master oscillator is tuned be changed by a small amount, the whole keyboard is shifted by that same amount, which provides a means of securing tuning to pitch. As another advantage, independent tuning of the various note-producing oscillators is greatly facilitated. That is, if any one of these oscillators is out of tune, such an oscillator will give indication of this fact by a slipping or beating effect, which only needs to be eliminated by adjustment of its circuit constants, to indicate its proper tuning, there being no possibility of doubt when a true tie-in is achieved. Still another advantage resides in the fact that tremolo or vibrato effects may be introduced into all of the controlled oscillators from a single point, namely, the master oscillator. Any suitable means for periodically varying the frequency of the master oscillator at a vibrato rate may be employed, as most simply illustrated in the patent to Langer No. 1,832,402, granted November 17, 1931.

The frequency relationships between controlled and controlling oscillators must be chosen with a thought as to the simplest fractions, as the smaller the numerator and denominator of the fraction are, the wider the region of natural period change over which the trigger action may take place and the more readily control may be effected. A careful analysis of the tempered scale shows that tie-in sequences between certain notes may be so selected as to give a maximum of control with correct musical tuning, as the frequency relationships practically take the form of simple fractions, as already explained. In practice, a single octave may be completely tied in, directly or through a sequence, to the master note, which may well be the upper C of that octave, and then other octaves may be tied in progressively below the master octave, thus completing a tie-in of the entire keyboard of the instrument. In this manner I have found that, by selectively grouping the various note-producing oscillators so as to cause the oscillators of each selected group to feed through a common output and by connecting appropriate filters one in each of the common outputs of these selected groups, any desired predetermined wave form for the keyboard as a whole may be attained.

Figure 6:
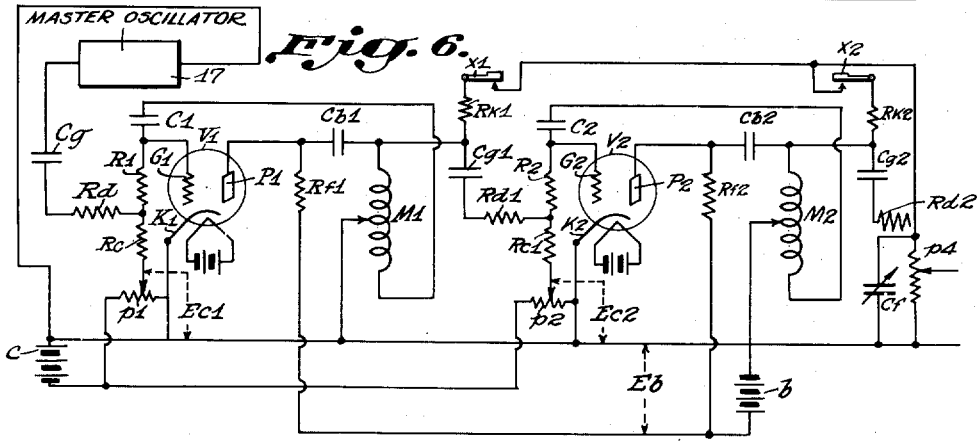
Fig. 6 is a view similar to Fig. 5, but in addition showing the master oscillator and coupling means through which the control may be effected from one oscillatory circuit to another.

Fig. 6 illustrates a means which has proved effective in practice for securing a tie-in of a plurality of note-producing oscillators with the master oscillator. The arrangement shown is for a multi-tone instrument and, except for the introduction of the master oscillator and the coupling elements by means of which the tie-in is effected, is the same as that of Fig. 5. The master oscillator is shown for simplicity as a rectangle 17, it being understood that its oscillations are established like those of the note-producing oscillators in accordance with the fundamental circuit of the invention. The master oscillator is coupled to the oscillator comprising the tube V1 by means of a condenser Cg and resistances Rc and Rd and the latter oscillator is coupled to the oscillator comprising the tube V2 by means of a condenser Cg1 and resistances Rc1 and Rd1, the resistances Rc and Rc1 being respectively connected in the grid-cathode circuits of the two tubes V1 and V2. Thus the oscillator comprising the tube V1 is directly controlled by the master oscillator, while the oscillator comprising the tube V2 is indirectly controlled by the master oscillator through the intermediary of the controlled oscillator comprising the tube V1. In this manner it is possible to tie-in any number of note-producing oscillators with the master oscillator, the condenser Cg2 and resistances Rd2 being shown connected to the output of the tube V2 for the purpose of illustrating this possibility. For a complete understanding of the apparatus shown, the function of the condenser Cg1 and resistances Rc1 and Rd1, providing the coupling between the oscillators comprising the tubes V1 and V2, only need be described, it being understood that each of the couplings provided between oscillators operates in identical manner. The condenser Cg1 acts as a blocking condenser by means of which the grid supply-potential of the tube V2 is isolated from the oscillatory plate-cathode circuits of the tube V1, but is so designed as to freely pass the controlling impulses supplied from the tube V1. The resistances Rc1 and Rd1 function as an ordinary voltage-divider, their values being so chosen that they will attenuate the controlling impulses introduced into the grid-cathode circuit of the tube V2 to an extent determined by the considerations for maximum trigger action for the harmonic relationship peculiar to the respective notes produced by the oscillators comprising the two tubes V1 and V2. The resistances Rc1 and Rd1 also serve to attenuate impulses from the controlled tube V2 to the controlling tube V1, thus eliminating to some extent the possibility of reverse control.

Figure 7:
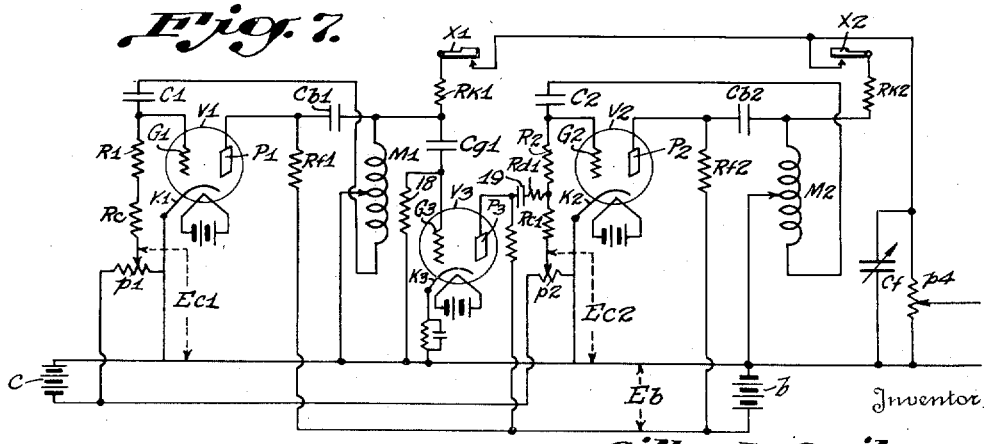
Fig. 7 is a modification of Fig. 6 showing an intermediate repeater tube included in the coupling between oscillatory circuits.

Another means by which assurance can be had that the controlled oscillators are always governed by the master oscillator is illustrated in Fig. 7, which shows the use of an isolating thermionic repeater tube V3 inserted between the controlling tube V1 and the controlled tube V2. In this instance the condenser Cg1 acts as a blocking condenser between the tubes V1 and V3 and is employed in association with a resistance 18 to couple the tube V1 to the tube V3, while the resistances Rc1 and Rd1 are employed together with a condenser 19 to couple the tube V3 to the tube V2, the values of the resistance Rc1 and Rd1 being chosen to attenuate the controlling impulses supplied from the output of the repeater tube V3. By thus interposing a vacuum tube repeater, the effect of reverse control can be entirely overcome where troublesome. It should also be observed that by introducing filter networks (not shown) in the coupling means employed between oscillators, unwanted harmonics present in the output of a controlling oscillator can be excluded from the input circuit of the oscillator which it controls, the effect being to purify or clarify the tone of the note produced by the controlled oscillator in certain instances, particularly where the controlled oscillator is at the end of a long controlled sequence. Moreover, by such filter networks improvement in the control may be obtained.

Figure 10:
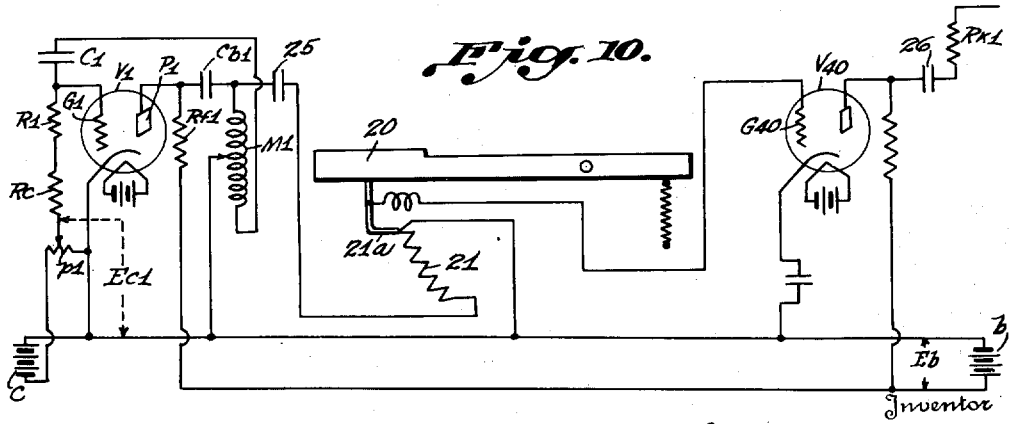
Fig. 10 is a view showing the possibility of associating with each oscillatory note-producing circuit a means whereby the intensity of its note may be varied at will by the distance its controlling key is depressed.

In an instrument of the character described various additional refinements may be added for the purpose of obtaining desired musical effects. For instance some or all of the keys, instead of merely closing switches, may be caused to vary the intensity of the notes as produced, a means to this end being illustrated in Fig. 10. Referring to this figure, the oscillator comprising the tube V1 is shown associated with a key 20 adapted to cooperate with a variable resistance 21 arranged as an output coupling so as to supply in varying amount the outgoing oscillations from said oscillator to the input of a repeater tube V40, the resistance Rk1 being in this instance connected in the output circuit of the tube V40. The slider 21a of the resistance is at all times in electrical connection with the grid G40 of the repeater tube, but is normally in contact with the zero potential end of the resistance 21 so that oscillations from the tube V1 are supplied through the repeater tube V40 only upon depression of the key 20, the note during its production being obviously capable of having its intensity regulated at will by the distance the key 20 is depressed. As shown, a blocking condenser 25 is connected with the resistance 21 in the output circuit of the tube V1, another blocking condenser 26 being connected with the resistance Rk1 in the output circuit of the tube V40.

Figure 8:
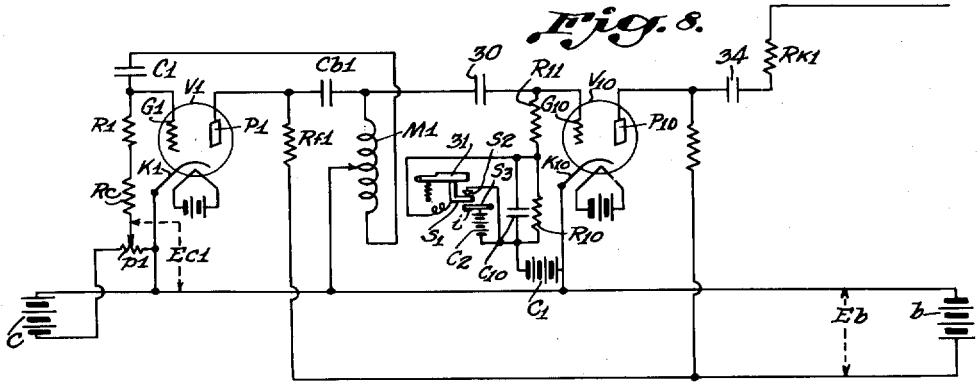
Fig. 8 shows the possibility of associating with each oscillatory note-producing circuit a means for automatically attenuating the intensity of its note upon key depression.

As a further elaboration of the invention, some or all of the notes may be automatically attenuated in intensity during the period of key depression and thus produce an effect similar to that of a plucked string, this concept being illustrated in Fig. 8. Here the oscillator comprising the tube V1 directly supplies its oscillations through a blocking condenser 30 to a repeater tube V10 having a condenser C10 and a resistance R10 connected in parallel with one another and in series with a resistor R11, in its grid-cathode circuit, the note produced by said oscillator being controlled by a key 31 adapted upon its depression to cause the bias at the grid G10 of the repeater tube to be progressively increased by discharge of the condenser C10 through the resistance R10. The key 31 is operatively associated with the contact S1 movable therewith and adapted to normally engage a fixed contact S2, still another contact S3 being provided to establish connection with the contact S1 during key depression. To satisfy the requirements of the apparatus under discussion, the connection between the contacts S1 and S3 should be effected momentarily and only during the downward stroke of the key 31, for which purpose the contact S3 in the embodiment illustrated is made of a flexible strip of conducting material fixed at one end and provided with insulation i beneath its free end portion, this construction obviously permitting the contact S1 to wipe past the end portion of the strip during its downward movement and to wipe past the insulation i during its upward movement. The condenser C10 is adapted to be normally short-circuited by the contacts S1 and S2, the movable contact S1 being connected to the grid side of the condenser C10 and the fixed contact S2 to the cathode side. For reasons which will shortly appear, two sources of opposite polarity are operatively associated with the grid-cathode circuit of the tube V10, these sources being indicated in the embodiment illustrated by batteries c1 and c2. The battery c1 is permanently connected in the grid-cathode circuit so that potential therefrom is at all times supplied to the grid G10, while the battery c2 is so connected that its voltage is impressed across the condenser C10 and potential therefrom is supplied to the grid G10 during the short interval of time that the contacts S1 and S3 are caused to engage with one another, the flexible contact S3 being connected through the battery c2 to the cathode side of the condenser C10. The battery c1 determines the normal bias at the grid G10, its voltage being so chosen as to supply a potential beyond cutoff when the key 31 is in its normal position of release. Both the batteries c1 and c2 determine the initial operating potential at the grid G10, the battery c2 having a voltage value such as to increase the potential at the grid G10 to an operating value by its opposition to the battery c1 when rendered effective by engagement of the contacts S1 and S3. It is thus apparent that oscillations from the tube V1 are supplied through the repeater tube V10 only upon key depression. The note is initiated at the instant connection is made between the contacts S1 and S3 and, because of the momentary character of this connection, the condenser C10 is almost instantly charged by the battery c2. Thereafter this charge is progressively dissipated through the resistance R10, the effect of which is to progressively increase the bias at the grid G10. This changing bias alters the amplification of the repeater tube, which amplification is gradually diminished with the result that the note is correspondingly gradually attenuated in intensity during its production. The action is comparable to that obtained in a piano wherein the hammer corresponding to the key depressed strikes the string and bounds clear until the key is again depressed. Moreover, when the key 31 is released, the contact S1 makes permanent connection with the contact S2, thereby short-circuiting the condenser c10 and abruptly terminating the sounding of the note. This embodiment of the invention thus duplicates the effect obtained by the striking of a piano key and subsequent release thereof, or by the plucking of a string and subsequent finger contact thereof. As shown, the resistance Rk1 and a blocking condenser 34 are connected in the output circuit of the tube V10.

Figure 9:
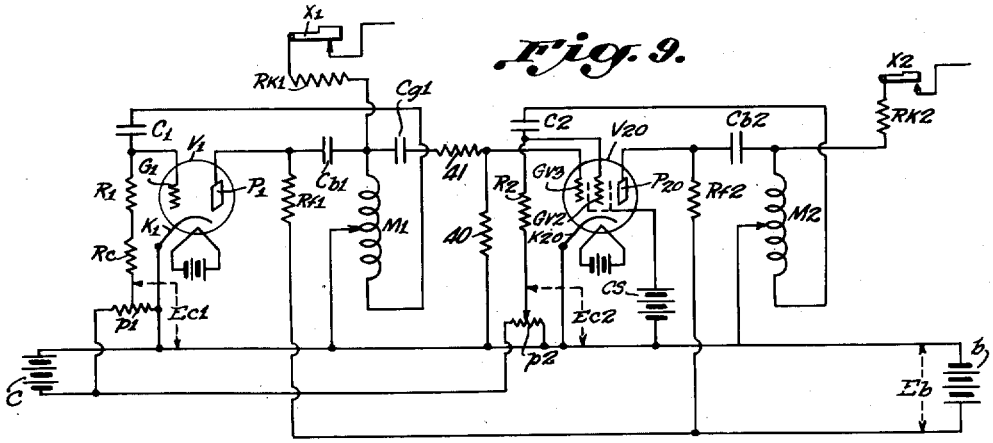
Fig. 9 is a modification of Figs. 6 and 7, showing a multi-element tube substituted for the tubes V2 and V3 of these figures.

In Fig. 9 there is shown a modified circuit wherein a multi-element tube V20 performs the separate functions of the tubes V2 and V3 of Fig. 7. The single plate P20 performs both the function of the element P2 of the tube V2 and the function of the element P3 of the tube V3, by operating in conjunction with the two grids GV2 and GV3, which perform the functions of the grids G2 and G3 of the tubes V2 and V3, respectively. The grids GV2 and GV3 are interposed in the electronic path between the plate P20 and the cathode K20, and one of these grids is surrounded by a perforated shield which receives a supply-potential from an external source *cs*. The controlling impulses are here attenuated by the resistances 40 and 41, which serve together with the blocking condenser *Cg1* to couple the controlling tube V1 to the grid GV3.

Figure 15A:
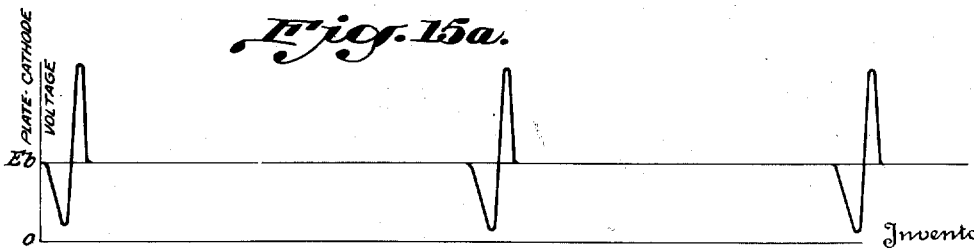
Fig. 15a shows two consecutive cycles of the output wave as derived from the plate-cathode branch of the oscillatory circuit, from the instant the operation of the device is initiated.

In the embodiments which have been described, the output wave is derived from the plate-cathode side of the oscillator and is therefore represented by the curve shown in Fig. 15*a*. It is also possible, however, to derive the output wave from the grid-cathode circuit, in which case it will then take the form shown in Fig. 15. It is understood, of course, that either form is rich in harmonics and adaptable to musical purposes.

Figure 19:
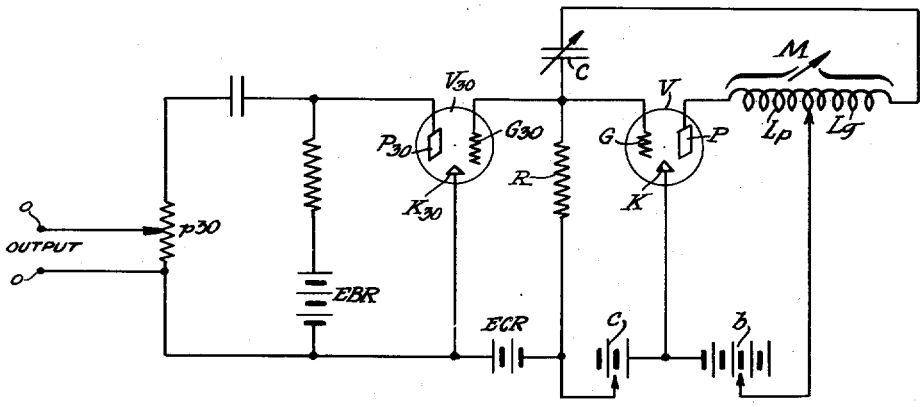
Figs. 19 and 20 show embodiments of the invention wherein the output wave is derived from the grid-cathode branch of the oscillatory circuit.
Figure 20:
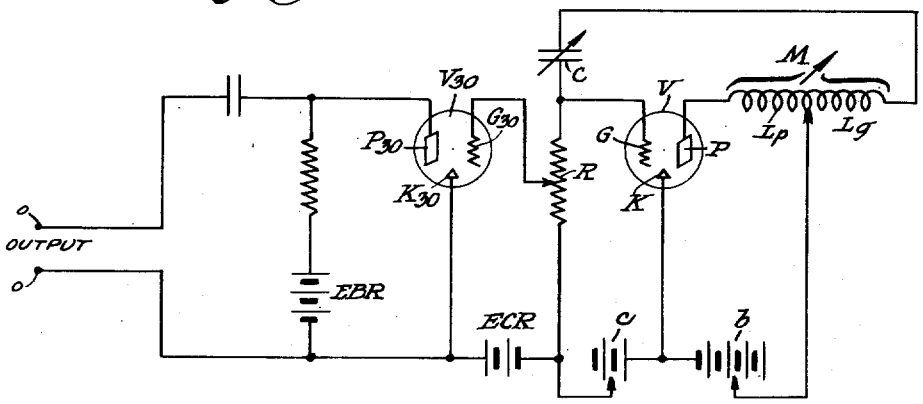

In Figs. 19 and 20, there are shown embodiments of the invention wherein the output wave is derived from the grid-cathode circuit. Thus, in either of these figures, the simple oscillatory circuit of Fig. 1 is shown supplying oscillations from its grid-cathode circuit to a thermionic repeater tube V30, which merely serves to amplify and communicate such oscillations to the output terminals *o*. The latter, as is obvious from previous description, may be connected through additional amplifying means, filter means or other accessories described, to the loud speaker. In Fig. 19 the intensity of the note produced is varied by a potentiometer *p*30, one end and the slider of which are connected to the terminals *o*. In Fig. 20, the grid G30 of the repeater tube is connected to a slider cooperating with the resistance R of the oscillatory circuit, the adjustment of the slider effecting a variation in the intensity of the note. Except for these differences, the two arrangements shown in Figs. 19 and 20 are similar in operation. In either case, the grid and plate supply-potentials ECR and EBR are so selected that, during operation, the potential at the grid G30 does not pass beyond cutoff or into the positive region. In this way, the voltage wave across the grid-cathode branch of the oscillatory circuit may be extracted without substantially affecting the operation of the latter circuit, the repeater tube circuit serving to effectively isolate the oscillatory circuit from the accessories in electrical connection with the output terminals *o*.

What is claimed is:

1. In a device for the production of musical sound, an oscillator comprising a thermionic tube having a plate, a grid, and a heated cathode, a plate-cathode circuit and a grid-cathode circuit, a resistance connected in said grid-cathode circuit, feed-back means having two closely coupled portions one of which is connected in said plate-cathode circuit, a condenser connected at one side to said grid and at the other side to the other of said portions, said condenser being in electrical connection through said other portion with said cathode, and potential-supplying means for operating said tube, said feed-back means being poled to cause said condenser to periodically rapidly accumulate a charge such as to bias said grid beyond cutoff whereby its period of discharge through said resistance substantially determines the frequency of the oscillations.

2. In a device for the production of musical sound, an oscillator comprising a thermionic tube having a plate, a grid, and a heated cathode, a plate-cathode circuit and a grid-cathode circuit, a resistance connected in said grid-cathode circuit, a mutual inductance having two closely coupled windings one of which is connected in said plate-cathode circuit, a condenser connected at one side to said grid and at the other side to the other of said windings, said condenser being in electrical connection through said other winding with said cathode, and potential-supplying means for operating said tube, said inductance being poled to cause said condenser to periodically rapidly accumulate a charge such as to bias said grid beyond cutoff whereby its period of discharge through said resistance substantially determines the frequency of the oscillations.

3. In a device for the production of musical sound, an oscillator comprising a thermionic tube having a plate, a grid, and a heated cathode, a grid-cathode circuit and a plate-cathode circuit, a resistance connected in said grid-cathode circuit, an inductance having a portion connected in said plate-cathode circuit, a condenser connected at one side to said grid and at the other side to the other portion of said inductance, said condenser being in electrical connection through said other portion with said cathode, and potential-supplying means for operating said tube, said inductance being poled to cause said condenser to periodically rapidly accumulate a charge such as to bias said grid beyond cutoff whereby its period of discharge through said resistance substantially determines the frequency of the oscillations.

4. In a device for the production of musical sound, an oscillator comprising a thermionic tube having a plate, a grid, and a heated cathode, a plate-cathode circuit and a grid-cathode circuit, a resistance connected in said grid-cathode circuit, feed-back means having two closely coupled portions one of which is connected in said plate-cathode circuit, a condenser connected at one side to said grid and at the other side to the other of said portions, said condenser being in electrical connection through said other portion with said cathode, and means for supplying operating potentials from a single source to said plate and grid, said feed-back means being poled to cause said condenser to periodically rapidly accumulate a charge such as to bias said grid beyond cutoff whereby its period of discharge through said resistance substantially determines the frequency of the oscillations.

5. In a device for the production of musical sound, an oscillator comprising a thermionic tube having a plate, a grid, and a heated cathode, a plate-cathode circuit and a grid-cathode circuit, a resistance connected in said grid-cathode circuit, feed-back means having two closely coupled portions one of which is connected in said plate-cathode circuit, a condenser connected at one side to said grid and at the other side to the other of said portions, said condenser being in electrical connection through said other portion with said cathode, means for supplying operating potentials to said plate and grid, said feed-back means being poled to cause said condenser to periodically rapidly accumulate a charge such as to bias said grid beyond cutoff whereby its period of discharge through said resistance substantially determines the frequency of the oscillations, and means for adjusting the grid-operating potential to effect frequency adjustment.

6. In a device for the production of musical sound, an oscillator comprising a thermionic tube having a plate, a grid, and a heated cathode, a plate-cathode circuit and a grid-cathode circuit, resistance means connected in said grid-cathode circuit, feed-back means having two closely coupled portions one of which is connected in said plate-cathode circuit, capacity means connected at one side to said grid and at the other side to the other of said portions, said capacity means being in electrical connection through said other portion with said cathode, and potential-supplying means for operating said tube, said feed-back means being poled to cause said capacity means to periodically rapidly accumulate a charge such as to bias said grid beyond cut-off whereby its period of discharge through said resistance means substantially determines the frequency of the oscillations, at least one of said resistance and capacity means being variable to effect frequency variation.

7. In a device for the production of musical sound, a thermionic tube having a plate, a grid, and a heated cathode, a plate-cathode circuit and a grid-cathode circuit, a resistance and a switch connected in series with one another in said grid-cathode circuit, feed-back means having two closely coupled portions one of which is connected in said plate-cathode circuit, a condenser connected at one side to said grid and at the other side to the other of said portions, said condenser being in electrical connection through said other portion with said cathode, potential-supplying means for operating said tube, said feed-back means being poled so that upon closing of said switch said condenser is caused to periodically rapidly accumulate a charge such as to bias said grid beyond cutoff whereby its period of discharge through said resistance substantially determines the frequency of the oscillations, and means for normally supplying cutoff potential to said grid.

8. In a device for the production of musical sound, a thermionic tube having a plate, a grid, and a heated cathode, a plate-cathode circuit and a grid-cathode circuit, a plurality of resistances, a plurality of operating switches respectively connecting said resistances in said grid-cathode circuit, feed-back means having two closely coupled portions one of which is connected in said plate-cathode circuit, a condenser connected at one side to said grid and at the other side to the other of said portions, said condenser being in electrical connection through said other portion with said cathode, and potential-supplying means for operating said tube, said feed-back means being poled so that upon actuation of any of said switches said condenser is caused to periodically rapidly accumulate a charge such as to bias said grid beyond cutoff whereby its period of discharge through any of said resistances substantially determines the frequency of the oscillations, said resistances being of different values to effect the establishment of different frequencies.

9. In a device for the production of musical sound, a thermionic tube having a plate, a grid, and a heated cathode, a plate-cathode circuit and a grid-cathode circuit, a plurality of resistances, a plurality of switches respectively connecting said resistances in said grid-cathode circuit, feed-back means having two closely coupled portions one of which is connected in said plate-cathode circuit, a condenser connected at one side to said grid and at the other side to the other of said portions, said condenser being in electrical connection through said other portion with said cathode, and means for supplying operating potentials to said plate and grid, said feed-back means being poled so that upon actuation of any of said switches said condenser is caused to periodically rapidly accumulate a charge such as to bias said grid beyond cutoff whereby its period of discharge through any of said resistances substantially determines the frequency of the oscillations, said resistances being of different values to effect the establishment of different frequencies, said potential-supplying means including a plurality of tuning potentiometers respectively connected in said grid-cathode circuit by said switches.

10. In a device for the production of musical sound, two oscillators each comprising a thermionic tube having a plate, a grid, and a heated cathode, a plate-cathode circuit and a grid-cathode circuit, a resistance connected in said grid-cathode circuit, feed-back means having two closely coupled portions one of which is connected in said plate-cathode circuit, and a condenser connected at one side to said grid and at the other side to the other of said portions, said condenser being in electrical connection through said other portion with said cathode, potential-supplying means for operating both tubes, in each of said oscillators said feed-back means being poled to cause said condenser to periodically rapidly accumulate a charge such as to bias said grid beyond cutoff whereby its period of discharge through said resistance substantially determines the frequency of the oscillations, said oscillators being adapted to produce musically related frequencies, and coupling means between said oscillators communicating attenuated impulses from one to the grid-cathode circuit of the other to cause said one to control the frequency of said other.

11. In a device for the production of musical sound, two oscillators each comprising a thermionic tube having a plate, a grid, and a heated cathode, a plate-cathode circuit and a grid-cathode circuit, a resistance connected in said grid-cathode circuit, feed-back means having two closely coupled portions one of which is connected in said plate cathode circuit, and a condenser connected at one side to said grid and at the other side to the other of said portions, said condenser being in electrical connection through said other portion with said cathode, potential-supplying means for operating both tubes, in each of said oscillators said feed-back means being poled to cause said condenser to periodically rapidly accumulate a charge such as to bias said grid beyond cutoff whereby its period of discharge through said resistance substantially determines the frequency of the oscillations, said oscillators being adapted to produce musically related frequencies, and coupling means between said oscillators communicating attenuated impulses from one to the grid-cathode circuit of the other to cause said one to control the frequency of said other, said coupling means isolating said oscillators to prevent reverse control.

12. In a device for the production of musical sound, an oscillator comprising a thermionic tube having a plate, a grid, and a heated cathode, a plate-cathode circuit and a grid-cathode circuit, a resistance connected in said grid-cathode circuit, feed-back means having two closely coupled portions one of which is connected in said plate-cathode circuit, a condenser connected at one side to said grid and at the other side to the other of said portions, said condenser being in electrical connection through said other portion with said cathode, and potential-supplying means for operating said tube, said feed-back means being poled to cause said condenser to periodically rapidly accumulate a charge such as to bias said grid beyond cutoff whereby its period of discharge through said resistance substantially determines the frequency of the oscillations, and a repeater tube circuit through which the oscillations are supplied comprising a second condenser and a second resistance connected in parallel with one another between the grid and cathode of the repeater tube, means for normally supplying cutoff potential to the grid of the repeater tube, a key, means cooperating with said key for momentarily supplying operating potential to the grid of the repeater tube and simultaneously therewith momentarily charging said second condenser, and means rendered operative by release of said key for normally short-circuiting said second condenser.

13. In an electrical musical instrument for the simultaneous playing of a plurality of musical notes, the combination of a generator of electrical impulses of relatively high frequency, a first frequency divider stage for producing electrical impulses of a lower harmonically related frequency, said first stage comprising a multi-electrode electron discharge device having an input circuit and two output circuits, the input circuit of said first stage including a first connection to supply a signal from said generator to said first stage, a second frequency divider stage for producing electrical impulses of still lower harmonically related frequency, said second frequency divider stage comprising an electron discharge device having an input circuit and an output circuit, one of the output circuits of said first stage including a second connection for carrying a signal from said first frequency divider stage to the input circuit of said second stage, a common transmission circuit, the other output circuit of said first stage including a third connection for carrying a signal from said first stage to said common transmission circuit, the output circuit of said second stage including a fourth connection for carrying a signal from said second stage to said common transmission circuit, an impedance in one of the output circuits of said first stage for preventing undesirable reaction between the two output circuits of said first stage, a key to complete a circuit through said third connection to said common transmission circuit, and a key to complete a circuit through said fourth connection to said common transmission circuit.

14. The combination set forth in claim 13 in which the generator is of the variable frequency type for the purpose of causing variations in all of said frequencies to produce a vibrato effect.

15. The combination set forth in claim 13 in which said impedance is in said first mentioned output circuit of said first stage, said impedance consisting of the impedance between an additional grid and other electrodes included in the electron discharge device of said second frequency divider stage.

16. The combination set forth in claim 13 in which said impedance is in said second mentioned output circuit of said first frequency divider stage, said impedance consisting of the grid to other electrode impedance of the input circuit of an additional key-controlled repeater tube.

17. The combination set forth in claim 13 in which the manner of operation of one of said keys determines the intensity envelope of the signal carried to said common transmission circuit.

18. The combination set forth in claim 13 in which said impedance is partially controlled by the operation of one of said keys.

19. The combination set forth in claim 13 in which each of said frequency divider stages comprises a multi-element discharge device of the vacuum type.

20. The combination set forth in claim 13 in which the electron discharge device in said second stage is a vacuum tube having a plurality of grids effectively placed to modulate the electron stream in said device.

21. The combination set forth in claim 13 in which there is an impedance in each of the output circuits of said first frequency divider stage for preventing undesirable reaction between said output circuits of said stage.

22. The combination set forth in claim 13 in which an electron discharge device, acting as a switch, effects the completion of the circuit.

23. The combination set forth in claim 13 in which an electron discharge device, acting as an impedance varying with time, controls the effectiveness with time of one of said circuits completed by the operation of the key.

GILBERT SMILEY.